(12) United States Patent
Mikes

(10) Patent No.: US 6,839,136 B2
(45) Date of Patent: Jan. 4, 2005

(54) HOLOGRAPHIC GRATING SPECTRUM ANALYZER

(75) Inventor: Thomas L. Mikes, Ashby, MA (US)

(73) Assignee: Agilent Technologies, Inc., Palo Alto, CA (US)

(*) Notice: Subject to any disclaimer, the term of this patent is extended or adjusted under 35 U.S.C. 154(b) by 69 days.

(21) Appl. No.: 10/011,236

(22) Filed: Oct. 19, 2001

(65) Prior Publication Data
US 2002/0126280 A1 Sep. 12, 2002

Related U.S. Application Data

(63) Continuation of application No. PCT/US01/40004, filed on Feb. 1, 2001.
(60) Provisional application No. 60/179,519, filed on Feb. 1, 2000.

(51) Int. Cl.[7] .............................. G01J 3/18; G01J 3/28
(52) U.S. Cl. ...................................... 356/328; 356/334
(58) Field of Search ................................ 356/305, 326, 356/328, 334

(56) References Cited

U.S. PATENT DOCUMENTS 3,567,322 A * 3/1971 Brehm et al. ............... 356/326
3,753,618 A * 8/1973 Haley ......................... 356/334
5,212,537 A * 5/1993 Birang et al. ............... 356/328

* cited by examiner

Primary Examiner—F. L. Evans

(57) ABSTRACT

A spectrum analyzer providing an integrated calibration function and for providing that calibration function automatically. The injection of light to be analyzed through a central aperture of a scanning grating onto a focusing reflector provides in combination four traversals of the space therebetween. The spectrometer thus is used to separate wavelength information spacially and receive it back at the same or adjacent aperture(s) to be analyzed by a processing system to establish the spectra for the incident light. The light is typically injected from and received back into optical fibers or other light carrying elements. Calibration light is also applied through the same or adjacent apertures in the grating from a known source and spectra such as Argon to use as a calibration reference by detecting the known spectra peaks and correlating it to grating scan angle. The same structure is also used as a telecommunications channel router by injecting light of multi-channel and thus broadband spectral content into the spectrometer through the central aperture(s) and angling the grating so that a selected channel or channels are reflected back after four passages of the spectral separator to output one or more optical fibers or other guides.

26 Claims, 3 Drawing Sheets

HOLOGRAPHIC GRATING SPECTRUM ANALYZER

CROSS REFERENCE TO RELATED APPLICATIONS

This application claims priority under 35 U.S.C. § 119(e) to provisional patent application serial No. 60/179,519 filed Feb. 1, 2000; the disclosure of which is incorporated herein by reference.

This application is a continuation of and claims priority to application PCT/US01/40004, filed Feb. 1, 2001.

STATEMENT REGARDING FEDERALLY SPONSORED RESEARCH OR DEVELOPMENT

Not Applicable

FIELD AND BACKGROUND OF THE INVENTION

In spectral analysis a beam of light is applied to an instrument which spreads the light into a spectrum angling the light at angles which are a function of the wavelength. The thus spread light is detected at points to be able to identify the light peaks or more complete the intensity versus wavelength and thus determine the spectrum and its associated source characteristics.

Present day resolution needs require spectral analysis of high resolution and positional accuracy. This in turn requires more linearity, calibration accuracy and optical resolving power than is available in present day instrumentation.

BRIEF SUMMARY OF THE INVENTION

These and other features are overcome by the present invention which provides a spectrum analyzer having an integrated calibration function and for providing that calibration function automatically. The invention also provides injection of light to be analyzed through a central aperture of a scanning grating onto a focusing reflector which provides in combination four traversals of the space therebetween. The spectrometer thus is used to separate wavelength information spacially and receive it back at the same or adjacent aperture(s) to be analyzed by a processing system to establish the spectra for the incident light. The light is typically injected from and received back into optical fibers or other light carrying elements. Calibration light may also be applied through the same or adjacent apertures in the grating from a known source and spectra such as Argon to use as a calibration reference by detecting the known spectra peaks and correlating it to grating scan angle.

The same structure can also be used as a telecommunications channel router by injecting light of multi-channel and thus broadband spectral content into the spectrometer through the central aperture(s) and angling the grating so that a selected channel or channels are reflected back after four passages of the spectral separator to apply it as an output to one or more optical fibers or other guides.

DESCRIPTION OF THE DRAWING

These and other features of the invention are more fully described below in the detailed description and the accompanying drawing of which.

DETAILED DESCRIPTION

The present invention relates to a spectrum analyzer providing an integrated calibration function and for providing that calibration function automatically. The invention also provides injection of light to be analyzed through a central aperture of a scanning grating onto a focusing reflector. The reflector and grating provide in combination four traversals of the space therebetween of injected light in achieving the sprectral analysis or selection function of the invention. The spectrometer thus is used to separate wavelength information spacially and receive it back at the same or adjacent aperture(s) to be analyzed by a processing system to establish the spectra for the incident light. The light is typically injected from and received back into optical fibers or other light carrying elements. Calibration light may also be applied through the same or adjacent apertures in the grating from a known source and spectra such as Argon to use as a calibration reference by detecting the known spectral peaks and correlating them to grating scan angle.

The same structure can also be used as a telecommunications channel router by injecting light of multi-channel and thus broadband spectral content into the spectrometer through the central aperture(s) and angling the grating so that a selected channel or channels are reflected back after four passages of the spectral separator as output one or more optical fibers or other guides.

Figure 1:
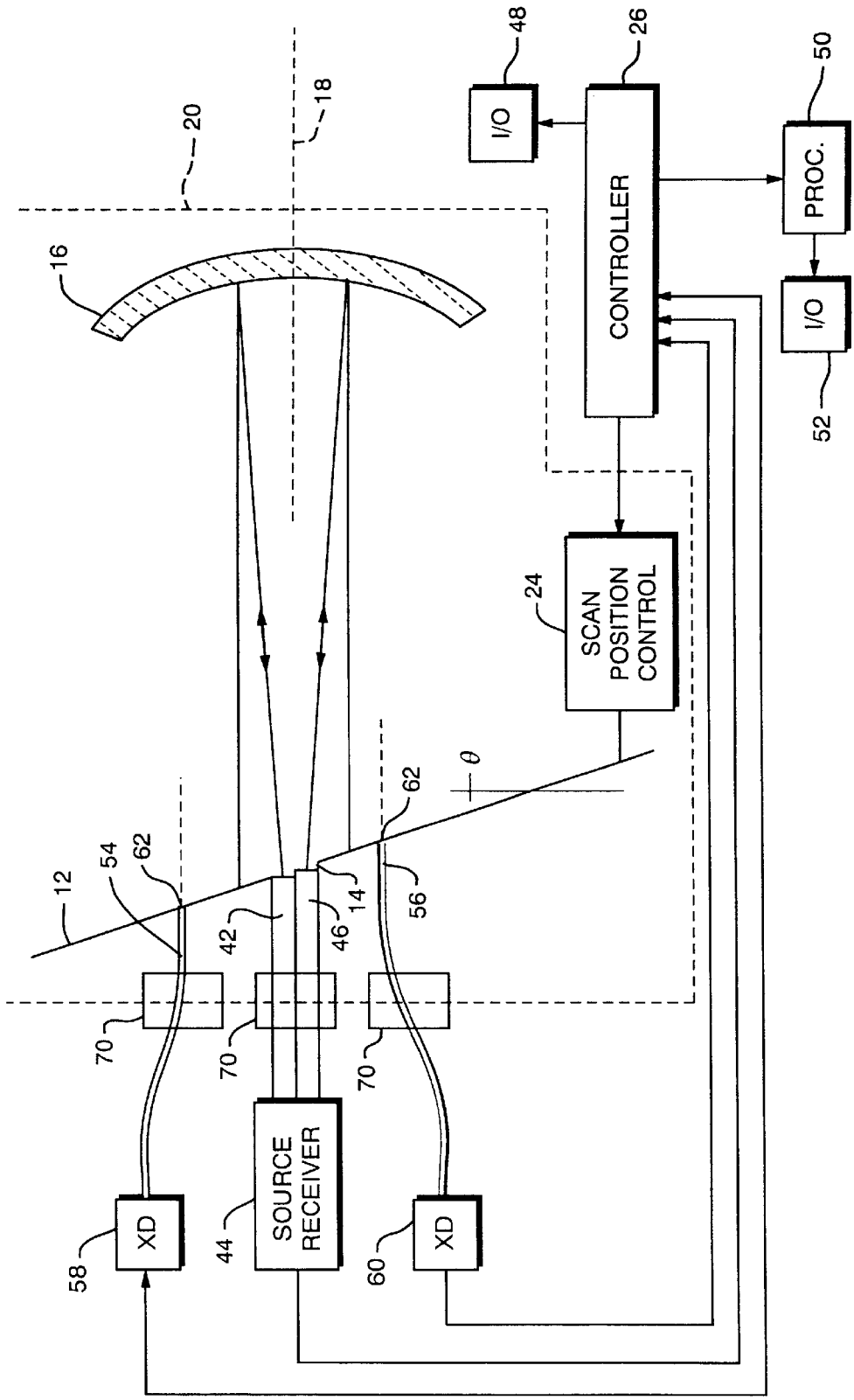
FIG. 1 is a diagram of a spectrum analyzer according to the invention.
Figure 1A:
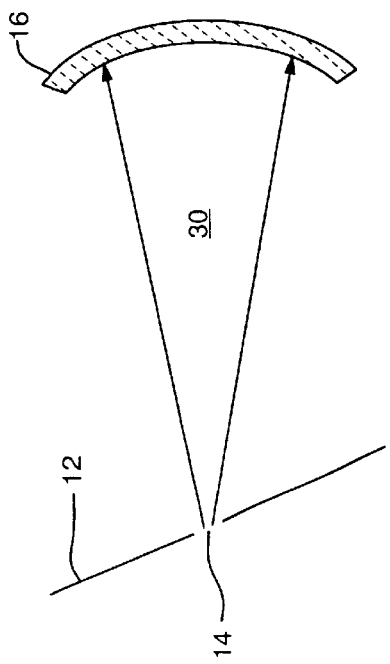
FIGS. 1*a, b, c,* and *d* illustrate the principles of operation of the invention.

An example of such a system is illustrated with respect to FIG. 1. As shown there, a analytical spectrometer has a plane grating 12 with a central aperture 14 preferably lying at the focus of a focusing reflector 16. The focusing reflector 16 is preferably a parabolic reflector with the aperture 14 also located at the reflector's focus point along its optical axis 18.

Typically the plane grating and parabolic reflector 16 are located within a housing 20. The housing 20, the plane grating 12 and the parabolic reflector 16 are then preferably of a low TCE (thermal coefficient of expansion) material for stabilizing the system against thermal drifts in operation. Temperature regulation may also be used.

The plane grating 12 is pivoted for rotation, preferably about the aperture 14. Radiation that enters from the aperture 14, and is dispersive in that it is directed toward the parabolic reflector 16 over an angle, will be returned toward the plane grating as a collimated beam of the complete spectral content; be-it as multi-channel or material specific content it will have an extended spectrum representative of the light's wavelength content. The reflected light strikes the plane grating and is reflected again, but because of the grating's holographically applied pattern, the angle of reflection is a function of the light's wavelength.

The pivoted plane grating 12 is pivoted about an axis orthogonal to the plane of the drawing and preferably passing through the aperture 14. That angle of inclination is controlled by a scan position controller 24 under the control of a micro processor, controller 26. The angle is controlled in a scanning function for use of the instrument as an optical spectrum analyzer as described below or set at predetermined angles for use as a channel router in telecommunications as described below.

Figure 1B:
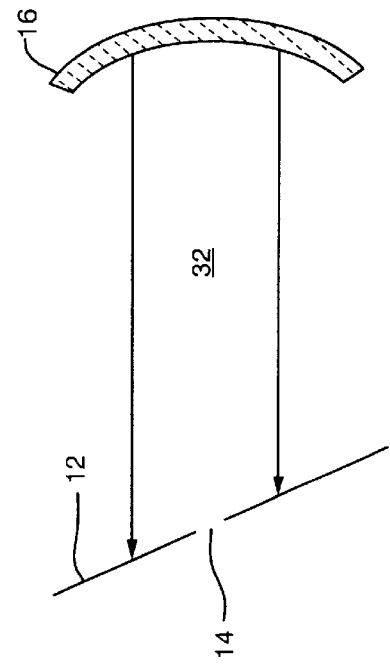
Figure 1C:
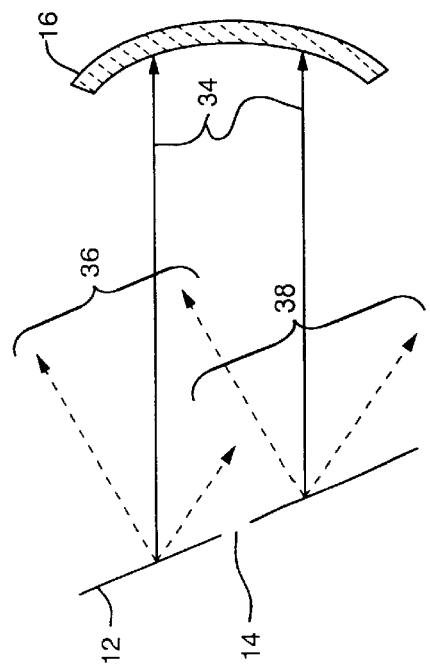
Figure 1D:
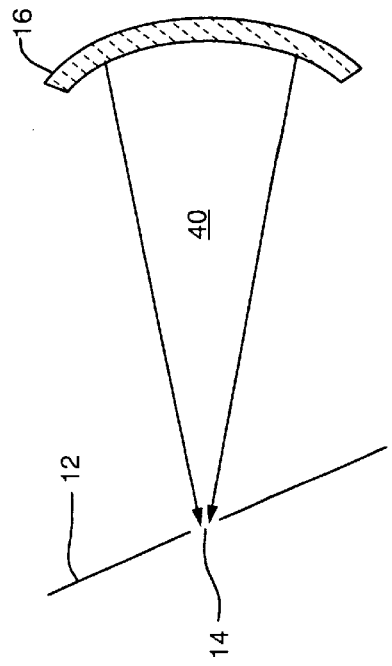

This principle of operation is more fully illustrated with respect to FIG. 1*a*–FIG. 1*d*. As shown first in FIG. 1*a*, the light to be analyzed or routed is applied through the aperture 14 and disperses in a broadened pattern 30 of fanned out or dispersed radiation. Since this radiation is sent toward the parabolic reflector 16 from the focus point of the reflector at 14, the reflected light will be a collimated beam 32 as shown in FIG. 1b. This collimated beam contains all of the wavelengths of the incoming or injected light 30. Collimated beam 32 is reflected or diverted by the plane grating 12 at angles corresponding to the wavelength of the incoming beam. One of those wavelengths is reflected back upon the same (or nearly the same or an adjacent path) as the incoming beam 32 to form a beam 34 at a specific wavelength. Other wavelengths are reflected at different angles such as on paths 36 and 38 to show only two out of the spectral continuum created by the plane grating 12.

The radiation on path 34 is reflected again by the parabolic reflector 16 and returned directly to the aperture 14. The geometries are adjusted for the returning beam to be applied back through the same fiber 42 or a closely positioned fiber 46. In the case of a selected channel in a channel routing function. The returned light 40 is of the selected wavelength that corresponds to the channel of interest. In the case of optical spectrum analysis, the returned beam 40 is continuously changed in wavelength by the scanning motion of the plane grating as it scans over the spectral range of the incoming injected light.

In the latter function, the scan position control system 24 causes the plane grating 12 to execute a typically linear scan of angles over a prescribed range to be able to process a selected portion of the spectrum. In one embodiment, the injected light is provided by an input fiber 42 from a source/receiver 44 which may include light from a specimen being analyzed. The returned radiation may be redirected over the same fiber 42 or a further fiber 46 to the source/receiver 44 where its intensity is detected and a signal representative of the intensity transmitted to a processor, controller 26. The processor controller 26 correlates the intensity with scan angle of the plane grating 12 to form a spectrum of the light injected into the spectrometer. This information may be provided for operator use through an I/O device 48 or further analyzed in a processor 50 for identification of the material originating the spectrum and that data provided for operator use via an I/O device 52.

Figure 2:
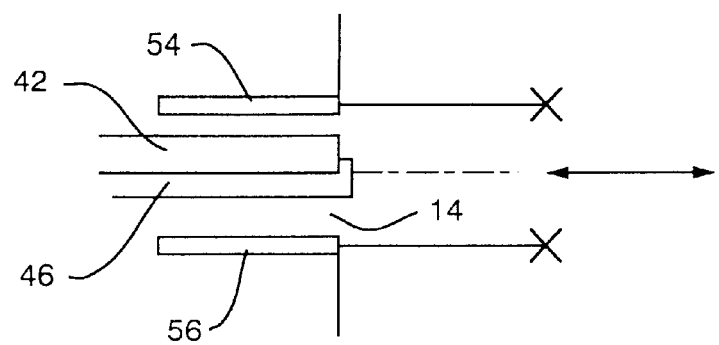
FIG. 2 illustrated an alternative embodiment for use in the analyzer of FIG. 1.
Figure 3:
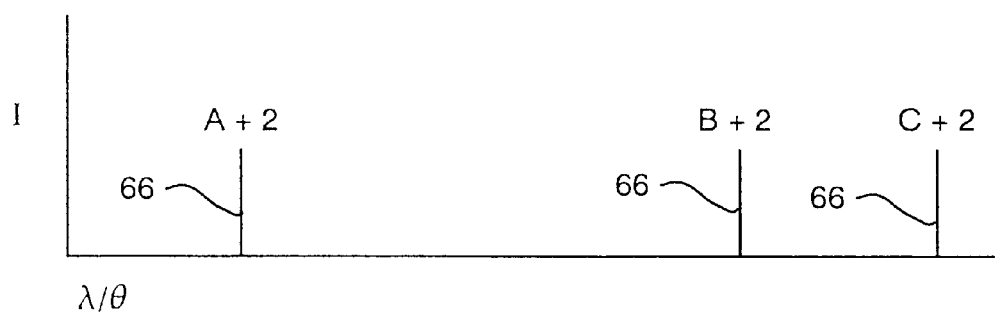
FIG. 3 is a wavelength spectrum useful in understanding the invention.

The plane grating 12 is typically formed by holographic processes from two recording points positioned to achieve the grating function desired. The grating may be an original exposure as processed to reveal the grating surface or may be a replication as desired. The invention allows for calibration of the angle of the grating and in that function it may be desirable to provide a grating having a first mode at 1500 nm and a second mode at 750 nm and for using an Argon laser as a calibration source. The embodiment also contemplates that optional additional fibers 54 and 56 be provided for applying and receiving Argon laser light to the spectrometer from and to transducers 58 and 60, such as lasers and detectors. The information from and to these transducers communicates with the controller 26 for correlating the grating angle against the known spectra for the calibration source, in this case Argon. The fibers 54 and 56 may have their individual apertures 62 or operate through the single aperture 14 with the fibers 42 and 46 as shown in FIG. 2. The spectral information provided to the controller 26 allows the correlation of lines 66 shown in FIG. 3 from the spectrum under analysis with that of the known Argon or other spectrum and imparts the feature of automated calibration on a continuous basis.

In the application of the invention as a channel router, the controller 26 receives switching information from an external source that directs the controller 26 to angle the plane grating 12 to select a desired channel(s) for separation in the spectrometer structure and distribution to the intended output fiber(s).

The fibers 42 and 46 may be sealed to form a waveguide. The entire unit of the spectrometer within the housing 20 may be sealed and the fibers 42 and 46; 54 and 56 accessed thought couplings or interfaces 70.

What is claimed is:

1. An optical spectrum sensitive instrument comprising:
   a plane grating having an aperture therethrough at a predetermined location;
   a parabolic reflector positioned with its axis passing at least near said aperture;
   a light conductor assembly injecting light of multiwavelength spectral content through said aperture toward said reflector for reflection toward said plane grating whereby the spectral content of said injected light is spread and redirected toward said parabolic reflector for reflection back toward said aperture with a spectral portion returned back through said aperture and into said light conductor assembly;
   a positioner coupled to said plane grating and controlling in response to an input an angle of said plane grating over a range about an axis that maintains said aperture positioned to pass said injected and returning light; and
   a calibrator automatically and continuously calibrating the instrument by detecting a predetermined spectral content in light returned back through said aperture, and adjusting the angle of the plane grating in accordance with the detected predetermined spectral content.

2. The instrument of claim 1 wherein said plane grating has a first order mode at 1500 nm and a second order mode at 750 nm.

3. The instrument of claim 2 wherein the predetermined spectral content is Argon radiation spectra.

4. The instrument of claim 1 wherein said parabolic reflector is positioned with the plane grating aperture at least near the focus point of said parabolic reflector whereby radiation injected through said aperture is returned by reflection by said parabolic reflector to said grating as substantially collimated light and said plane grating redirects said collimated light back toward said parabolic reflector as substantially collimated light at angles corresponding to wavelength of said light so that collimated light of a unique wavelength is reflected by said parabolic reflector back toward said aperture.

5. The instrument of claim 1 further including a multichannel optical waveguide having a termination for the injection and reception of light proximate to said aperture.

6. The instrument of claim 1 further including a housing for said grating and parabolic reflector, with said housing, reflector and grating of low coefficient of thermal expansion material.

7. The instrument of claim 1 further including a sealed fiber optic assembly having a termination approximate said aperture.

8. The instrument of claim 1 further including plurality of calibration radiation interfaces adjacent a central location of said aperture for emitting radiation having the predetermined spectral content to said parabolic reflector and receiving radiation from said parabolic reflector to thereby detect the predetermined spectral content by the calibrator.

9. The instrument of claim 1 further comprising a controller for the positioner and responsive to an input for positioning said plane grating at an angle to redirect light having the predetermined spectral content injected through said aperture back to said aperture.

10. The instrument of claim 9 wherein said injected light is multi-channel telecommunications signals with telecommunications channels separated by wavelength and said controller operates in response to said signal to select channel for return to said aperture.

11. An optical spectrum sensitive instrument comprising:
a grating having an aperture therethrough at a predetermined location;
a focussing reflector positioned with its axis passing at least near said aperture, said aperture being adapted for a light conductor assembly to inject light of multiwavelength spectral content through said aperture toward said reflector for reflection toward said plane grating whereby the spectral content of said injected light is spread and redirected toward said reflector for reflection back toward said aperture with a selected spectral portion returned back through said aperture and into said light conductor assembly;
a positioner coupled to said grating and controlling in response to an input an angle of said grating over a range about an axis that maintains said hole positioned to pass said injected and returning light; and
a calibrator automatically and continuously calibrating the instrument by detecting a predetermined spectral content in light returned back through said aperture, and adjusting the angle of the plane grating in accordance with the detected predetermined spectral content.

12. The instrument of claim 11 wherein said grating has a first order mode at 1500 nm and a second order mode at 750 nm.

13. The instrument of claim 12, wherein the predetermined spectral content is Argon radiation spectra.

14. The instrument of claim 11 wherein said reflector is positioned with the grating aperture at least near a focus point of said reflector whereby radiation injected through said aperture is returned by reflection by said reflector to said grating as substantially collimated light and said plane grating redirects said collimated light back toward said reflector as substantially collimated light at angles corresponding to wavelength of said light so that collimated light of a unique wavelength is reflected by said reflector back toward said aperture.

15. The instrument of claim 11 further including a multichannel optical waveguide having a termination for the injection and reception of light proximate to said aperture.

16. The instrument of claim 11 further including a housing for said grating and reflector, with said housing, reflector and grating being of low coefficient of thermal expansion material.

17. The instrument of claim 11 further including a sealed fiber optic assembly having a termination approximate said aperture.

18. The instrument of claim 11 further including a plurality of calibration radiation interfaces adjacent a central location of said aperture for emitting radiation having the predetermined spectral content to said reflector and receiving radiation from said reflector to thereby detect the predetermined spectral content by the calibrator.

19. The instrument of claim 11 further comprising a controller for the positioner and responsive to an input for positioning said grating at an angle to redirect light having the predetermined spectral content injected through said aperture back to said aperture.

20. The instrument of claim 19 wherein said injected light is multi-channel telecommunications signals with telecommunications channels separated by wavelength and said controller operates in response to said signal to select a channel for return to said aperture.

21. An optical spectrum sensitive instrument comprising:
a plane grating having an aperture therethrough at a predetermined location;
a parabolic reflector positioned with its axis passing at least near said aperture;
a light conductor assembly injecting light of multiwavelength spectral content through said aperture toward said reflector for reflection toward said plane grating whereby the spectral content of said injected light is spread and redirected toward said parabolic reflector for reflection back toward said aperture with a spectral portion returned back through said aperture and into said light conductor assembly;
a positioner coupled to said plane grating and controlling in response to an input an angle of said plane grating over a range about an axis that maintains said aperture positioned to pass said injected and returning light; and
a controller for the positioner and responsive to an input for positioning said plane grating at an angle to redirect a predetermined spectral range injected through said aperture back to said aperture, wherein said injected light is multi-channel telecommunications signals with telecommunications channels separated by wavelength and said controller operates in response to said signal to select channel for return to said aperture.

22. An optical spectrum sensitive instrument comprising:
a grating having an aperture therethrough at a predetermined location;
a focussing reflector positioned with its axis passing at least near said aperture, said aperture being adapted for a light conductor assembly to inject light of multiwavelength spectral content through said aperture toward said reflector for reflection toward said plane grating whereby the spectral content of said injected light is spread and redirected toward said reflector for reflection back toward said aperture with a selected spectral portion returned back through said aperture and into said light conductor assembly;
a positioner coupled to said grating and controlling in response to an input an angle of said grating over a range about an axis that maintains said hole positioned to pass said injected and returning light; and
a controller for the positioner and responsive to an input for positioning said grating at an angle to redirect a predetermined spectral range injected through said aperture back to said aperture, wherein said injected light is multi-channel telecommunications signals with telecommunications channels separated by wavelength and said controller operates in response to said signal to select a channel for return to said aperture.

23. An optical spectrum sensitive instrument comprising:
a plane grating having an aperture therethrough;
a parabolic reflector, the plane grating being positioned with respect to the reflector so that light injected through the aperture is reflected by the reflector and thereby returned back through the aperture; and
a calibrator automatically and continuously calibrating the instrument by detecting a predetermined spectral content in light returned back through the aperture, and adjusting the angle of the plane grating in accordance with the detected predetermined spectral content.

24. An optical spectrum sensitive instrument comprising:

a plane grating having an aperture therethrough;

a parabolic reflector, the plane grating being positioned with respect to the reflector so that light injected through the aperture is reflected by the reflector and thereby returned back through the aperture; and means for automatically and continuously calibrating the instrument by detecting a predetermined spectral content in light returned back through the aperture, and adjusting the angle of the plane grating in accordance with the detected predetermined spectral content.

25. An optical spectrum sensitive instrument comprising:

a plane grating having an aperture therethrough;

a parabolic reflector, the plane grating being positioned with respect to the reflector so that both a first light having a multiwavelength spectral content and a second light having a predetermined spectral content injected through the aperture are reflected by the reflector and thereby returned back through the aperture; and a calibrator automatically and continuously calibrating the instrument by detecting the predetermined spectral content in the returned second light, and adjusting the angle of the plane grating in accordance with the detected predetermined spectral content.

26. An optical spectrum sensitive instrument comprising:

a plane grating having an aperture therethrough;

a parabolic reflector, the plane grating being positioned with respect to the reflector so that both a first light having a multiwavelength spectral content and a second light having a predetermined spectral content injected through the aperture are reflected by the reflector and thereby returned back through the aperture; and means for automatically and continuously calibrating the instrument by detecting the predetermined spectral content in the returned second light, and adjusting the angle of the plane grating in accordance with the detected predetermined spectral content.

* * * * *